United States Patent [19]

Sazzarrini

[11] Patent Number: 5,139,370
[45] Date of Patent: Aug. 18, 1992

[54] APPARATUS FOR THE CONTINUOUS DISPOSAL OF WASTE MATERIALS GENERATED BY MACHINES FOR TEXTILE PRODUCTS

[76] Inventor: Vinicio Sazzarrini, via Pracatice, Impruneta (Firenze), Italy

[21] Appl. No.: 547,462

[22] Filed: Jul. 2, 1990

[30] Foreign Application Priority Data

Jul. 14, 1989 [IT] Italy ................................ 9478 A/89

[51] Int. Cl.⁵ .............................................. B65G 53/60
[52] U.S. Cl. ...................................... 406/171; 406/172
[58] Field of Search ................. 406/171, 172, 109, 28, 406/145, 180, 183

[56] References Cited

U.S. PATENT DOCUMENTS 1,849,119  3/1932  Stoetzel ............................. 406/180
2,564,969  8/1951  Goldberg ........................... 406/171
4,312,608  1/1982  Nakhle et al. ..................... 406/171

FOREIGN PATENT DOCUMENTS 83830  5/1921  Austria ................................... 406/28

Primary Examiner—Margaret A. Focarino
Assistant Examiner—Gary C. Hoge
Attorney, Agent, or Firm—McGlew & Tuttle

[57] ABSTRACT

An apparatus for the continuous disposal of waste materials generated by one or more textile machines is provided which functions without interrupting the working of the textile machines. The apparatus includes a main container of large capacity with an aspirator positioned downstream of the main container. The main container includes a door which is openable downwardly for emptying the main container. An auxiliary container is provided disposed connected to a conduit for incoming waste materials. The auxiliary container is positioned upstream of the main container. A gate valve is provided connected to an enclosure around the auxiliary container and an enclosure around the main container. The valve interrupts the suction through the main container and simultaneously activates suction through the auxiliary container. An arrangement is provided for operating the adjusting valve. Arrangement is also provided for opening the door of the main container and closing the door of the main container and structure is provided for facilitating the emptying of the main container.

12 Claims, 2 Drawing Sheets

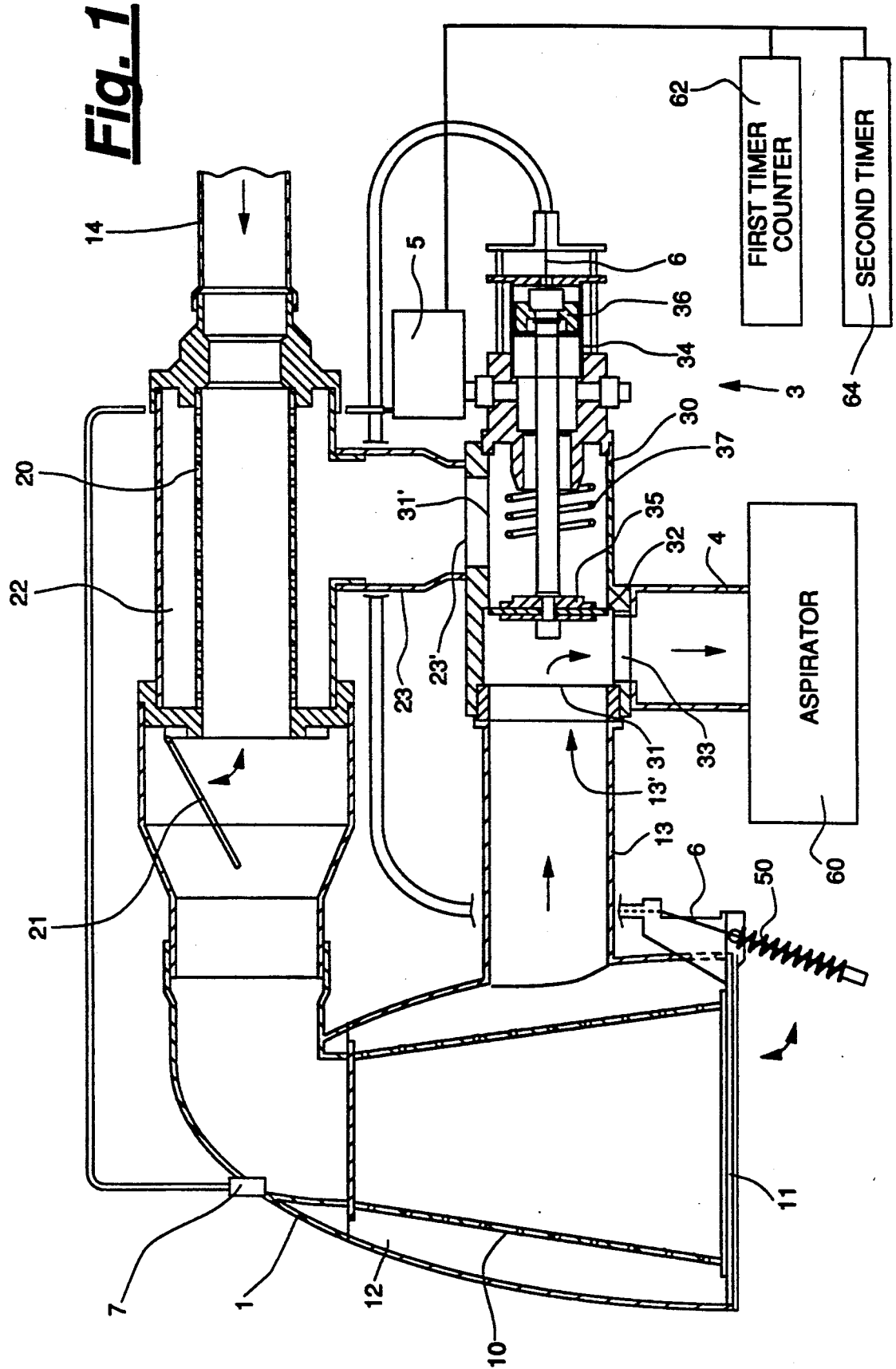

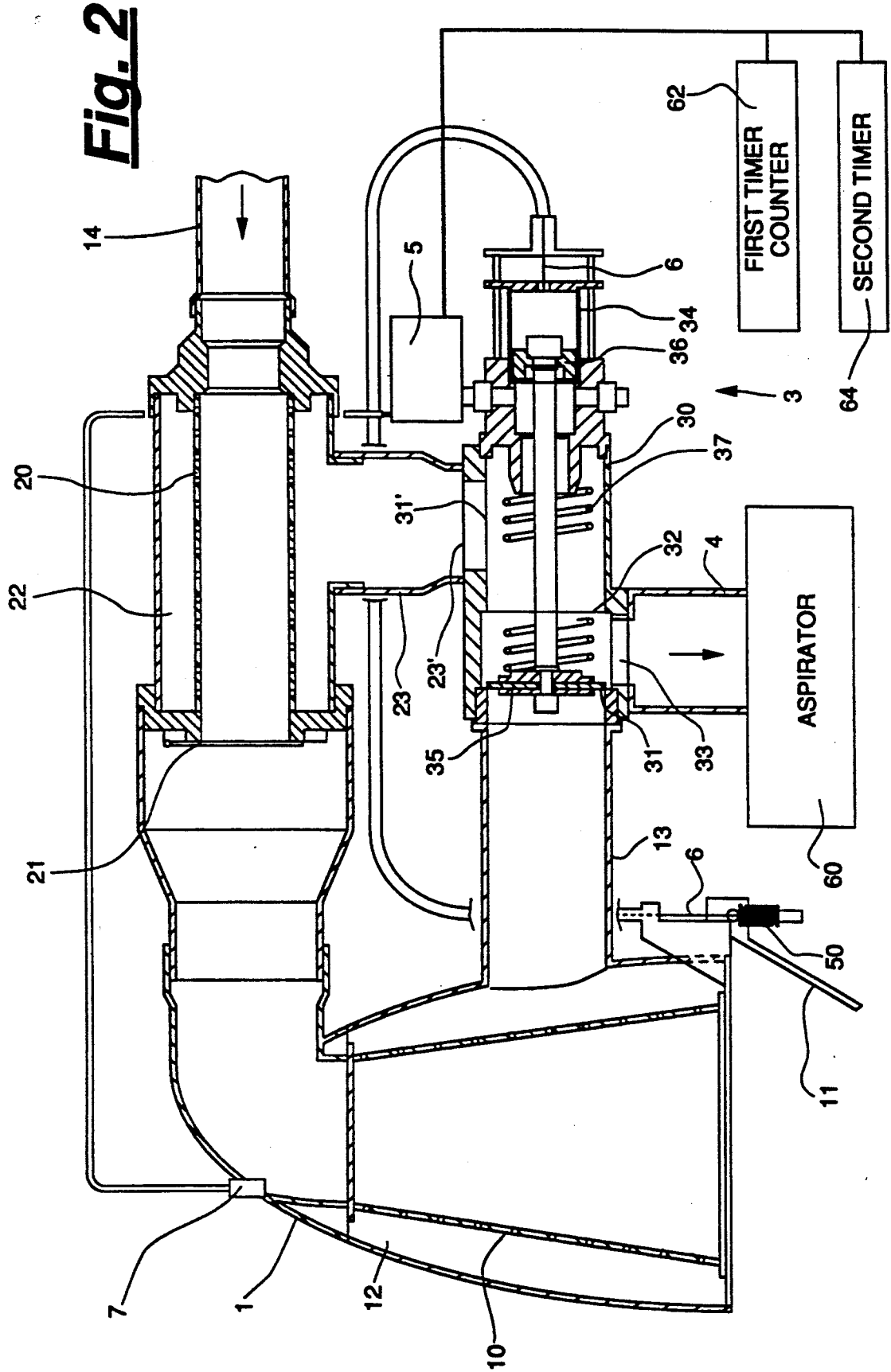

APPARATUS FOR THE CONTINUOUS DISPOSAL OF WASTE MATERIALS GENERATED BY MACHINES FOR TEXTILE PRODUCTS

FIELD OF THE INVENTION

The present invention refers to an automatic apparatus for the continuous disposal of waste material produced by one or more machines for textile products.

BACKGROUND OF THE INVENTION

It is known that during the production stage of textile products by any operative, waste-forming machine, such as a sewing and cutting machine, suction means are provided for removing the surplus material in the way of formation Such a suction means collects the surplus material inside a box located in the vicinity of the machine. In case of a plurality of operative machines which generate waste materials simultaneously, said suction means are generally centralized, as it is usually preferred to collect the surplus material from all the machines into a single container of large capacity, normally located at a considerable distance from the machines.

Obviously, in both cases there is the need of removing the waste materials from the containers when the containers become full. To allow this, in case of a box of a single machine, it is necessary to stop the latter from a time required for emptying the box and cleaning the relevant filters. In the case of a centralized storage, it is necessary to stop the main suction system together with all the machines. For this reason, the emptying operation is, if possible, carried out at the end of the work shift.

Apart from the need of requiring personnel in charge of the disposal of waste material from the various boxes or from the centralized storage and the loss of production in the case of a forced stop of one or more machines during a work shift, the repeated occurrence of the above mentioned interventions may cause complications especially with regard to the efficiency of the suction system.

SUMMARY AND OBJECTS OF THE INVENTION

The present invention has the object of eliminating all the above mentioned drawbacks by providing an automatic apparatus for the removal and collection of waste material generated by one or more machines for textile products, without stopping any of the machines.

This result has been achieved, according to the invention, by adopting the idea of collecting, by suction, all the waste materials inside a first self-emptying container of large capacity, upstream of which a second tubular container of small capacity is located. The waste materials are collected simultaneously during the time necessary to clear out the main container, following the interception of the exit of the main container and the suction diversion from the first to the second container.

The advantages attained by the invention consist essentially in that it is possible to automatically collect and discharge the waste materials from one or more machines without stopping any of the machines. Further, it is possible to adjust the suction to obtain the best grip and removal of the waste materials generated by the relevant machine. The invention makes it possible to increase productivity. Additionally, the apparatus according to the invention is of simple construction, easy to install without any modification to the centralized suction systems already in existence for textile waste, of great flexibility, of automated regulation, and of very high reliability even after a long period of continuous operation.

These and further advantages and characteristics of the invention will be better understood by anyone skilled in the field by the following description in conjunction with the attached drawings given as a practical exemplification of an embodiment of the invention, but not to be considered in a limiting sense.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a longitudinal axial sectional view of an apparatus according to the invention under normal operating conditions, that is, upon the collection of the waste materials into a main container; and FIG. 2 is a longitudinal axial sectional view of the apparatus of FIG. 1 upon the emptying of the main container, with dwell of the waste materials in an auxiliary container.

DETAILED DESCRIPTION OF THE PREFERRED EMBODIMENT

Referring to the drawings in particular, the invention comprises an apparatus for disposal of waste materials generated by one or more machines for textile products. The apparatus operates without stopping any of the machines. The apparatus includes a body generally designated 1 provided with a main container 10. The main container 10 is provided with a large capacity. The main container 10 is preferably of truncated cone shape and extends with respect to a vertical central axis. The container is open at its top and its bottom and is provided with a door 11 that can be opened downwardly. The container 10 is provided with a perforated side surface and is housed within an airtight enclosure 12 connected at a downstream connection to a suction conduit 4 of an aspirator duct of a blower 60 (shown schematically). The suction conduit 4 is connected to the airtight enclosure 12 via a conduit 13. The airtight enclosure 12 is connected upstream with one or more machines for textile products through a conduit 14 and via an auxiliary container or secondary container 20 which is interposed between conduit 14 and an upstream connection of airtight enclosure 12.

The auxiliary container 20 is preferably provided of cylindrical shape and disposed having a central horizontal axis. The auxiliary container 20 is open at its ends (upstream connection and downstream connection) and is provided with perforated sidewalls. The auxiliary container 20, which forms an extension of the conduit 14, is housed within an airtight enclosure 22. This airtight enclosure 22 is in turn connected at an additional connection to a suction conduit 4 through a conduit 23. An outlet of the auxiliary container 20 is provided with gate valve means in the form of a gate valve 21 to intercept the inlet of the main container 10 and to thereby allow for the retention of waste materials in the auxiliary container 20 and the waste materials coming from the various textile machines (during the emptying of the main container 10).

The invention provides valve means in the form of a piston valve 3 which is pneumatically controlled and regulated through a solenoid valve 5. A cylindrical body 30 of the piston valve 3 is provided with a first inlet 31 provided in correspondence with the outlet 13' of the conduit 13 of the main container 10. A second inlet 31' is located on the opposite side of the disc 35 in correspondence with the outlet 23' of the conduit 23 of the auxiliary container 20. An outlet 33 is provided which is located on the suction conduit 4. By this arrangement, the inflow of compressed air into the cylinder 34 causes the displacement of disc 35 in one direction until it closes the opening 32. A return spring 37 causes the displacement of disc 35 in the other direction until it closes the opening 31, after the discharge of the cylinder 34. By this arrangement, in a first case where the opening 32 is closed, the suction in the conduit 4 causes air to pass from conduit 14 to conduit 13 through the main container 1 (see FIG. 1). According to a second case, wherein the opening 31 is closed, the passage of air from the conduit 14 to the conduit 23 takes place through the auxiliary container 2 (see FIG. 2).

The invention provides means for operating both the opening and closing of the door 11 of the main container 11. This means includes a flexible cable 6 which is anchored at one end to a piston 36 of the pneumatic cylinder 34 and is anchored at the other end to the arm of the door 11. A counteracting spring 50 is interposed such that, with piston 36 at one or the other of its dead centers, there occurs the closing or opening of the door 11.

Control means are provided for facilitating removal of the waste materials collected inside the main container 10. The means includes a nozzle 7 supplied with compressed air from the exhaust of the pneumatic cylinder 34. The nozzle 7 directs air downwardly for removal of materials collected inside the main container 10.

Means are provided for regulating the operation of a solenoid valve 5 including a first timer or a counter 62, for counting a number of products which the textile machines generate, corresponding to the amount of waste material generated. The control means operates a discharge of the pneumatic cylinder 34 followed by the opening of the door 11 of the main container 10. A second timer 64 may be provided which controls the emptying time which, in turn, controls the actuation of the pneumatic cylinder 34 followed by the closing of the door 11.

The operation is as follows.

Under normal operating conditions, the pneumatic cylinder 34 under load keeps both the opening 32 and the door 11 of the main container 10 closed. The suction generated inside the conduit 4 causes the gate valve 21 to open and creates a vacuum inside the main container 10 so that the waste materials coming form conduit 14 cross the auxiliary container 20 and collect within the main container 10. As soon as this is brimful, the pneumatic cylinder 34 is made to empty, the spring 37 moves the disc 35 onto the opening 31, thereby closing it, and the cable 6 opens the door 11; as the main container 10 begins to clear out with the aid of the air jet from nozzle 7, the gate valve 21 is made to close by the action of the vacuum inside the enclosure 22, thereby forcing the waste materials coming from conduit 14 to dwell in the auxiliary container 20 for the time necessary to empty out the main container 10. Thereafter, the normal operating conditions are resumed.

Practically, the construction details may vary in any equivalent way as far at the shape, dimensions, element disposition, nature of the used materials are concerned, without nevertheless departing from the scope of the adopted solution idea and, therefore, remaining within the boundaries of the protection granted by the present patent for industrial invention.

While a specific embodiment of the invention has been shown and described in detail to illustrate the application of the principles of the invention,, it will be understood that the invention may be embodied otherwise without departing from such principles.

I claim:

1. An apparatus for continuous disposal of waste materials generated by machines for textile products, comprising: a main container including a bottom portion provided with a door, an upstream connection and a downstream connection; an aspirator duct connected to said downstream connection of said main container for generating a vacuum in said main container; a conduit for receiving incoming waste materials; an auxiliary container including an upstream connection connecting said auxiliary container to said conduit and including a downstream connection connected to said main container upstream connection and including an additional connection connected to said aspirator duct; valve gate means connected adjacent said auxiliary container downstream connection for closing said auxiliary container downstream connection; valve means for closing communication between said main container downstream connection and said aspirator duct and simultaneously providing communication between said auxiliary container additional connection and said aspirator duct and for closing said connection between said auxiliary container additional connection and said aspirator duct and simultaneously opening communication between said main container downstream connection and said aspirator duct; control means for operating and adjusting said valve means; actuation means for opening said door of said main container and closing said door of said main container; and, emptying means providing at said main container upstream connection for emptying said main container.

2. An apparatus according to claim 1, wherein said main container is formed as a truncated cone shaped basket element having a vertical central axis and including a perforated side surface, an open top connected to said upstream connection and a sealed enclosure connected to said downstream connection.

3. An apparatus according to claim 1, wherein said auxiliary container is formed as a cylindrical element with an essentially horizontal axis disposed in an airtight enclosure, said airtight enclosure being provided in communication with said additional connection.

4. An apparatus according to claim 2, wherein said valve means includes a piston and a valve body provided with a first opening connected to a suction conduit, said suction conduit being connected to said downstream connection of said main container and including a second opening connected to a second suction conduit, said second suction conduit being connected to said additional connection of said auxiliary container and including a third opening communicating with said aspirator conduit, said valve means including a disc in said valve body for selectively closing one of said first opening and said second opening.

5. An apparatus according to claim 1, wherein said valve means includes a single-acting control pneumatic piston valve.

6. An apparatus according to claim 1, wherein said control means includes a solenoid valve.

7. An apparatus according to claim 4, wherein said valve means includes means for biasing said valve disc into a position closing said second opening whereby said downstream opening of said main container is connected to said aspirator conduit.

8. An apparatus according to claim 6, wherein said control means includes one of a first timer and a counter for determining an amount of waste materials in said main container for controlling said solenoid valve for opening said door and a second timer for controlling said solenoid valve for closing said door a predetermined time after opening said door.

9. An apparatus according to claim 4, wherein said valve includes a spring acting on said disc, said spring urging said disc to close said first opening for providing communication between said auxiliary container and said aspirator conduit.

10. An apparatus according to claim 1, wherein said door actuation means includes a guided tension rod having an end fixed to a piston of said valve means and having another end fixed to said door and a spring interposed between said another end and said door, wherein movement of said piston to close said first opening moves said tension rod for compressing said spring and opening said door.

11. An apparatus according to claim 1, wherein said emptying means includes a nozzle positioned upstream of aid main container upstream opening, said nozzle being supplied with compressed air from an exhaust from said pneumatic valve.

12. An apparatus for continuous disposal of waste materials generated by textile products, comprising: a main container including a bottom portion provided with a door and an upstream connection and a downstream connection; an aspirator duct connected to said downstream connection of said main container for generating a vacuum in said main container; a conduit for receiving incoming waste materials; an auxiliary container including an upstream connection connected to said conduit and including a downstream connection connected to said main container upstream connection and including an additional connection connected to said aspirator duct; valve gate means connected adjacent said auxiliary container downstream connection for closing said auxiliary container downstream connection; valve means for closing communication between said main container downstream connection and said aspirator duct and simultaneously providing communication between said auxiliary container additional connection and said aspirator duct and for closing said connection between said auxiliary container additional connection and said aspirator duct and simultaneously opening communication between said main container downstream connection and said aspirator duct; control means for operating and adjusting said valve means; and actuation means for opening said door of said main container and closing said door of said main container.

* * * * *

UNITED STATES PATENT AND TRADEMARK OFFICE
CERTIFICATE OF CORRECTION

PATENT NO. : 5,139,370

DATED : August 18, 1992

INVENTOR(S) : Vinicio Gazzarrini

It is certified that error appears in the above-identified patent and that said Letters Patent is hereby corrected as shown below:

On the title page, Item [76]: should read, —Vinicio Gazzarrini, via Pracatice, Impruneta (Firenze), Italy—.

Signed and Sealed this

Twenty-first Day of September, 1993

Attest:

BRUCE LEHMAN

*Attesting Officer*     *Commissioner of Patents and Trademarks*